United States Patent
Aso

(10) Patent No.: US 12,531,482 B2
(45) Date of Patent: Jan. 20, 2026

(54) MULTI-OUTPUT SEPIC CONVERTER

(71) Applicant: SANKEN ELECTRIC CO., LTD., Niiza (JP)

(72) Inventor: Shinji Aso, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 209 days.

(21) Appl. No.: 18/505,298

(22) Filed: Nov. 9, 2023

(65) Prior Publication Data

US 2024/0072659 A1 Feb. 29, 2024

Related U.S. Application Data

(63) Continuation of application No. PCT/JP2021/019537, filed on May 24, 2021.

(51) Int. Cl.
*H02M 3/155* (2006.01)
*H02M 1/00* (2007.01)

(52) U.S. Cl.
CPC ......... *H02M 3/1557* (2021.05); *H02M 1/009* (2021.05)

(58) Field of Classification Search
CPC ....... H02M 3/1557; H02M 1/009; H02M 1/15
See application file for complete search history.

(56) References Cited

U.S. PATENT DOCUMENTS 10,097,017 B2 * 10/2018 Greening ............... H02M 3/158
10,186,955 B2 * 1/2019 Jitaru ................... H02M 1/0085
2017/0302176 A1 10/2017 Leong
2017/0331368 A1 11/2017 Koniakowsky et al.
2018/0041119 A1 * 2/2018 Zhang ................... H02M 3/156
(Continued)

FOREIGN PATENT DOCUMENTS

CN 108809091 A * 11/2018 ............. H05B 45/37
CN 109450252 A * 3/2019 ............ H02M 3/156
(Continued)

OTHER PUBLICATIONS

Machine Translation CN-209767386-U (Year: 2019).*
(Continued)

*Primary Examiner* — Thienvu V Tran
*Assistant Examiner* — Yahveh Comas Torres
(74) *Attorney, Agent, or Firm* — METROLEX IP LAW GROUP, PLLC; Robert L. Scott, Esq.

(57) ABSTRACT

A first coupling capacitor is electrically connected in series with an input side reactor. A positive rectifier diode is electrically connected in series with the first coupling capacitor. A positive output side reactor is electrically connected to a connecting point of the first coupling capacitor and the positive rectifier diode and a ground potential. A first smoothing capacitor is electrically connected to the positive rectifier diode and a ground potential. A second coupling capacitor is electrically connected in series with the first coupling capacitor. A negative rectifier diode is electrically connected to the positive output side reactor and the second coupling capacitor. A negative output side reactor is electrically connected to a connecting point of the second coupling capacitor and the negative rectifier diode. A second smoothing capacitor is electrically connected to the negative rectifier diode, the ground potential, and the negative output side reactor.

6 Claims, 7 Drawing Sheets

(56) References Cited

U.S. PATENT DOCUMENTS

2019/0173372 A1* 6/2019 Lin .................. H02M 1/143
2021/0351692 A1* 11/2021 Takenaka ............. H02M 1/36

FOREIGN PATENT DOCUMENTS

| | | | | | |
|---|---|---|---|---|---|
| CN | 209767386 | U | * | 12/2019 | |
| CN | 107453603 | B | * | 5/2020 | ............ H02M 3/145 |
| CN | 111464023 | A | * | 7/2020 | ............. H02M 3/08 |
| JP | 2014-17931 | A | | 1/2014 | |
| JP | 5477946 | B2 | | 4/2014 | |
| JP | 2017-511679 | A | | 4/2017 | |

OTHER PUBLICATIONS

Machine Translation CN-107453603-B (Year: 2020).*
Machine Translation CN-111464023-A (Year: 2020).*
Machine Translation CN-108809091-A (Year: 2018).*
Machine Translation CN-109450252-A (Year: 2019).*
Office Action issued on Oct. 1, 2024 in a counterpart Japanese patent application No. 2023-523711.
Office Action issued on May 24, 2024 in a counterpart Japanese patent application No. 2023-523711.
International Search Report of PCT/JP2021/019537 mailed on Jul. 20, 2021.

* cited by examiner

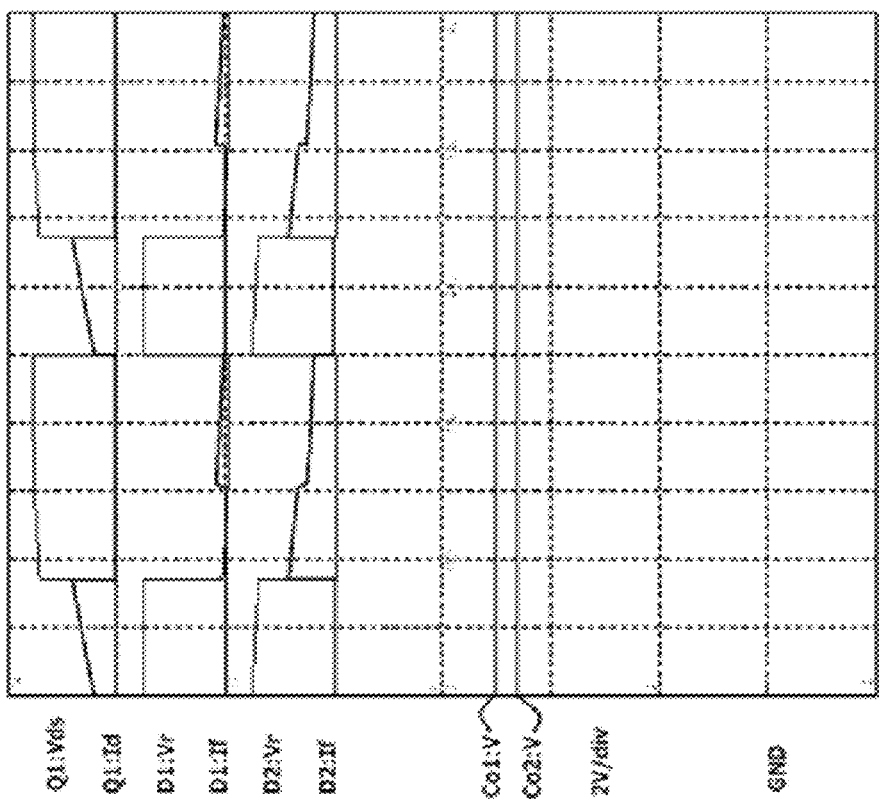
FIG. 5B --Related Art--
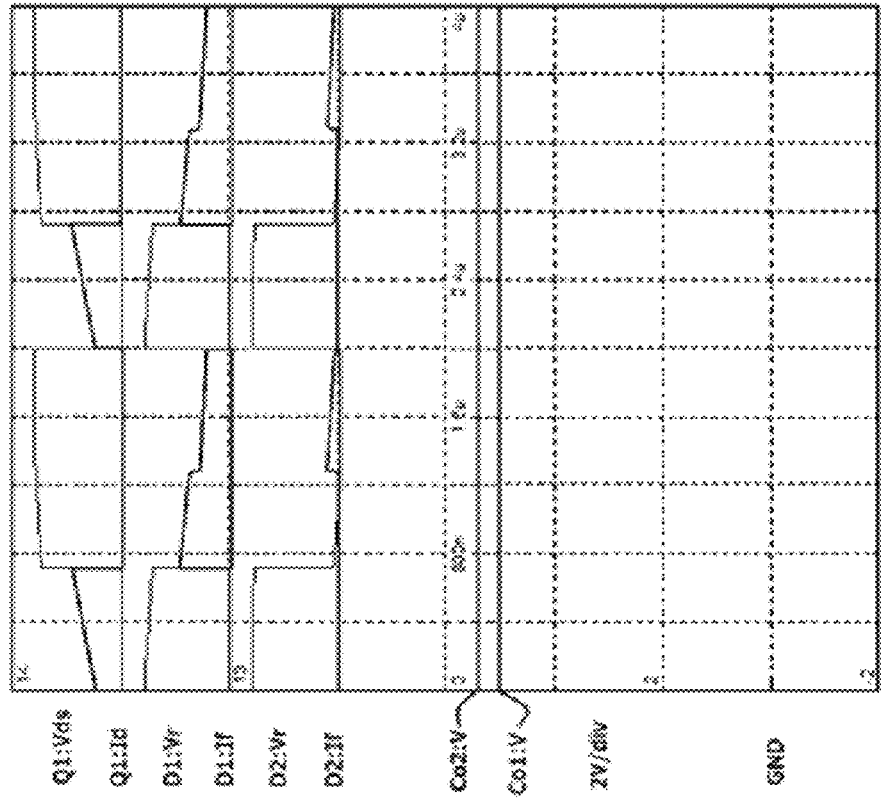
FIG. 5A --Related Art--

FIG.6
--Related Art--

| Q1 operation | D1, D2 operation | | Path | Condition |
|---|---|---|---|---|
| ON | D1:OFF D2:OFF | a | Vin→Lin→Q1→Vin | VLin=Vin |
| | | b | C1→Q1→L1→C1 | VL1=-Vc1 |
| | | c | C2→Q1→Co2→L2→C2 | VL2=-Vc2+Vco2 |
| OFF | D1:ON D2:ON | d | Vin→Lin→C1→D1→Co1→Vin | Vin+VLin-Vc1-Vco1=0 |
| | | e | Vin→Lin→C2→D2→Vin | Vin+VLin-Vc2=0 |
| | | f | L1→D1→Co1→L1 | VL1-Vco1=0 |
| | | g | L2→D2→Co2→L2 | VL2-Vco2=0 |
| | | h | L1→C1→D2→L1 | VL1+Vc1-Vc2=0 |
| | | i | L2→C2→C1→D1→Co1→Co2→L2 | VL2+Vc2-Vc1-Vco1-Vco2=0 |

FIG. 7

| Q1 operation | D1, D2 operation | Path | | Condition |
|---|---|---|---|---|
| ON | D1:OFF<br>D2:OFF | a | Vin→Lin→Q1→Vin | VLin=Vin |
| | | b | C1→Q1→L1→C1 | VL1=-Vc1 |
| | | c | C2→Q1→Co2→L2→C2 | VL2=-Vc2+VCo2 |
| OFF | D1:ON<br>D2:ON | d | Vin→Lin→C1→D1→Co1→Vin | Vin+VLin-Vc1-VCo1=0 |
| | | e | Vin→Lin→C1→C2→D2→Vin | Vin+VLin-Vc1-Vc2=0 |
| | | f | L1→D1→Co1→L1 | VL1-VCo1=0 |
| | | g | L2→D2→Co2→L2 | VL2-VCo2=0 |
| | | h | L1→C2→D2→L1 | VL1-Vc2=0 |
| | | i | L2→C2→D1→Co1→Co2→L2 | VL2+Vc2-VCo1-VCo2=0 |

MULTI-OUTPUT SEPIC CONVERTER

CROSS REFERENCE TO RELATED APPLICATIONS

This application claims priority based on 35 USC 119 from prior International Patent Application No. PCT/JP2021/019537 filed on May 24, 2021, the entire contents of which are incorporated herein by reference.

BACKGROUND

The disclosure relates to a DC/DC (Direct-Current to Direct-Current) converter including a single ended primary inductor converter (SEPIC).

A step-up/down converter is used as a method of generating a stable output voltage from an unstable input source, such as an automobile battery. Multiple power supplies are required to power sensors for safe operations of automobiles. CN109450252A (Patent Document 1) discloses, for example, a three-channel output DC/DC converter configured with a SEPIC circuit, as illustrated in FIG. 4. The Patent Document 1 discloses that the converter may provide a total of three different output voltages: one step-up output voltage and two step-up/down output voltages in a single converter.

FIG. 4 illustrates a SEPIC circuit according to a related art. The SEPIC circuit includes an input side reactor Lin, a switching element Q1, a decoupling capacitor C1, a positive side reactor L1, a diode D1, and a capacitor Co1, and outputs a positive output voltage +Vout. The SEPIC circuit includes a decoupling capacitor C2, a negative side reactor L2, a diode D2, and a capacitor Co2. The SEPIC circuit outputs a negative output voltage −Vout by reversing a polarity of an output rectifier diode and shifting the voltage with GND as positive. The SEPIC circuit also superimposes a regenerative energy of the input side reactor Lin on an input voltage Vin and rectifies the regenerative energy to obtain a step-up voltage +Vout2. An on/off drive signal of the switching element Q1 conducts a feedback control by calculating an error signal between a reference voltage Vref and the positive output voltage +Vout at a PWM signal controller Cont1.

The two step-up/down output voltages, the positive output voltage +Vout, and the negative output voltage −Vout in FIG. 4 are described. By setting the input side reactor Lin, the positive side reactor L1, and the negative side reactor L2 to the same inductance value and using a common circuit configuration for the input side reactor Lin and the switching element Q1 in the SEPIC circuit, the positive output voltage +Vout (a voltage VCo1 of the capacitor Co1) and the negative output voltage −Vout (a voltage VCo2 of the capacitor Co2) become the same voltage. The reason for the above mentioned is that a relationship between an input voltage and a duty D is similar as described below. To express the above relationship in a mathematical formula, first, since a charge and a discharge of the input side reactor Lin are equal in a steady state, the following relationship is established.

$Vin \cdot D = (VCo1 + Vc1 - Vin) \cdot (1-D)$ $D/(1-D) = (VCo1 + Vc1 - Vin)/Vin$      EQ(1)

Since the charge and the discharge of the positive side reactor L1 are equal as well, $Vc1 \cdot D = VCo1 \cdot (1-D)$ $D/(1-D) = VCo1/Vc1$      EQ(2)

From equations EQ(1) and EQ(2), $(Vout+Vc1-Vin)/Vin = VCo1/Vc1$ $Vc1 \cdot (Vout+Vc1-Vin) - VCo1 \cdot Vin = 0$ $Vc1 \cdot (Vout+Vc1) - Vc1 \cdot Vin - VCo1 \cdot Vin = 0$ $Vc1 \cdot (Vout+Vc1) - (Vc1+VCo1) \cdot Vin = 0$ $(Vc1-Vin) \cdot (Vc1+VCo1) = 0$ $\therefore Vc1 = Vin$ (However, Vc1=−VCo1 is not valid because of a breakdown of the diode D1.)

Therefore, the voltage of the decoupling capacitor C1 is Vin.

Also, from equation EQ(1), $D/(1-D)Vin = (VCo1 + Vc1 - Vin)$ $VCo1 = Vin \cdot (D/(1-D)) + Vin - Vc1 =$
$(VinD + Vin - VinD)/(1-D) - Vc1 = (Vin)/(1-D) - Vc1$ Since Vc1=Vin, $VCo1 = Vin-D/(1-D)$ Similarly, on a side of the negative output voltage −Vout, since the charge and the discharge of the input side reactor Lin are equal in the steady state, the following relationship is established.

$Vin \cdot D = (Vc2-Vin) \cdot (1-D)$ $D/(1-D) = (Vc2-Vin)/Vin$      EQ(3)

Since the charge and the discharge are equal for the negative output reactor L2 as well, $(Vc2-VCo2) \cdot D = VCo2 \cdot (1-D)$ $D/(1-D) = VCo2/(Vc2-VCo2)$      EQ(4)

From equations EQ(3) and EQ(4), $(Vc2-Vin)/Vin = VCo2/(Vc2-VCo2)$ $(Vc2-Vin) \cdot (Vc2-VCo2) = Vin \cdot VCo2$ $Vc2^2 - Vc2 \cdot VCo2 - Vin \cdot Vc2 + Vin \cdot VCo2 - Vin \cdot VCo2 = 0$ $Vc2^2 - Vc2 \cdot VCo2 - Vin \cdot Vc2 = 0$ $Vc2(Vc2 - VCo2 - Vin) = 0$ $Vc2 = Vin + VCo2$ The voltage of the decoupling capacitor C2 is the input voltage Vin+the negative output voltage VCo2.

Also, from equation EQ(3), $D/(1-D) = (Vc2-Vin)/Vin$ $Vin \cdot D/(1-D) = Vc2 - Vin$ $Vin \cdot D/(1-D) + Vin = Vc2$ $(Vin \cdot D + Vin - Vin \cdot D)/(1-D) = Vc2$ $Vin/(1-D) = Vc2$      EQ(5)

From equation EQ(4), $$D/(1-D)=VCo2/(Vc2-VCo2)$$

$$D\cdot(Vc2-VCo2)=VCo2(1-D)$$

$$D\cdot Vc2 - D\cdot VCo2 = VCo2 - D\cdot VCo2$$

$$D\cdot Vc2 = VCo2$$

$$Vc2 = VCo2/D \qquad \text{EQ(6)}$$

From equations EQ(5) and EQ(6), $$Vin/(1-D)=VCo2/D$$

$$VCo2=Vin\cdot D/(1-D)$$

Therefore, the same voltage is output for the positive output voltage +Vout (=VCo1) and the negative output voltage −Vout (=VCo2).

However, in the SEPIC circuit illustrated in FIG. 4, when the switching element Q1 is OFF, as illustrated in FIG. 6, a discharge path of the positive side reactor L1 is not only a discharge path f, which is the positive side reactor L1→the diode D1→the capacitor Co1→the positive side reactor L1, but also a discharge path h, which is the positive side reactor L1→the decoupling capacitor C1→the decoupling capacitor C2→the diode D2→the positive side reactor L1.

The discharge path of the negative side reactor L2 is not only a discharge path g, which is the negative side reactor L2→the diode D2→the capacitor Co2→the negative side reactor L2, but also a discharge path i, which is the negative side reactor L2→the decoupling capacitor C2→the decoupling capacitor C1→the diode D1→the capacitor Co1→the capacitor Co2→the negative side reactor L2.

Therefore, a relationship equation of the following is established.

$$VCo1=Vc2-Vc1$$

$$VCo2=VCo1+VCo2+Vc1-Vc2$$

When capacitances of the decoupling capacitor C1 and the decoupling capacitor C2 are large enough for an output current, the voltage Vc1 of the decoupling capacitor C1 becomes the input voltage Vin and the voltage Vc2 of the decoupling capacitor C2 becomes Vin+VCo2; therefore, VCo1=Vin+VCo2−Vin=VCo2.

However, when the capacitances of the decoupling capacitor C1 and the decoupling capacitor C2 are increased, time for the voltage of the decoupling capacitor C1 being equal to the input voltage Vin and the voltage of the decoupling capacitor C2 being equal to Vin+VCo2 may be long or a transient response speed may be slow as initial voltages of the decoupling capacitor C1 and the decoupling capacitor C2 are zero volts before a power supply operation. Therefore, selecting a small capacitance may be preferable for the decoupling capacitor C1 and the decoupling capacitor C2.

However, when the capacitances of the decoupling capacitor C1 and the decoupling capacitor C2 are reduced, a ripple voltage ΔVc1 and a ripple voltage ΔVc2 of the decoupling capacitor C1 and the decoupling capacitor C2, respectively, become larger. As a result, the voltage of the decoupling capacitor C1 is Vin+ΔVc1, and the voltage of the decoupling capacitor C2 is Vin+VCo2+ΔVc2.

Therefore, when a load current of the decoupling capacitor C1 is high and the load current of the decoupling capacitor C2 is low, or vice versa, the ripple voltage ΔVc1 of the decoupling capacitor C1 and the ripple voltage ΔVc2 of the decoupling capacitor C2 are added to the one with the lower load current. Therefore, an issue occurs that cross regulation between the positive output voltage VCo1 and the negative output voltage VCo1 deteriorates.

In other words, as illustrated in a cross regulation characteristic diagram in FIGS. 5A and 5B, when the positive and negative output voltages ±Vout are under a condition of a cross load current, the output voltage of the one with the higher load current decreases, while the output voltage of the one with the lower load current increases, resulting in a problem of poor cross regulation accuracy.

SUMMARY

A DC/DC converter providing positive and negative output voltages according to one or more embodiment may include an input side reactor; a first coupling capacitor; a positive rectifier diode; a positive output side reactor; a first smoothing capacitor; a second coupling capacitor; a negative rectifier diode; a negative output side reactor; and a second smoothing capacitor. In one or more embodiments, a positive output of the DC/DC converter may be electrically connected via the input side reactor, the first coupling capacitor, and the positive rectifier diode. The first smoothing capacitor may be electrically connected between the positive output and a ground potential. The positive output side reactor may be electrically connected between a connecting point of the first coupling capacitor and the positive rectifier diode and the ground potential. A negative output of the DC/DC converter may be electrically connected to a connecting point of the first coupling capacitor, the positive rectifier diode, and the positive output side reactor via the second coupling capacitor and the negative output side reactor. The second smoothing capacitor may be electrically connected between the negative output and the ground potential. The negative rectifier diode may be connected between a connecting point of the second coupling capacitor and the negative output side reactor and the ground potential.

A DC/DC converter providing positive and negative output voltages according to one or more embodiments may include an input side reactor; a first coupling capacitor that is electrically connected in series with the input side reactor; a positive rectifier diode that is electrically connected in series with the first coupling capacitor and outputs a positive output voltage; a positive output side reactor that is electrically connected to a connecting point of the first coupling capacitor and the positive rectifier diode and a ground potential; a first smoothing capacitor that is electrically connected to the positive rectifier diode and a ground potential; a second coupling capacitor that is electrically connected in series with the first coupling capacitor; a negative rectifier diode that is electrically connected to the positive output side reactor and the second coupling capacitor and outputs a negative output voltage; a negative output side reactor that is electrically connected to a connecting point of the second coupling capacitor and the negative rectifier diode; and a second smoothing capacitor that is electrically connected to the negative rectifier diode, the ground potential, and the negative output side reactor.

BRIEF DESCRIPTION OF DRAWINGS

FIG. 5A is a diagram illustrating cross regulation characteristics (Io(P)=100 mA, Io(M)=10 mA) in the related art such as is illustrated in FIG. 4;

FIG. 5B is a diagram illustrating cross regulation characteristics (Io(P)=10 mA, Io(M)=100 mA) in the related art such as is illustrated in FIG. 4;

FIG. 6 is a diagram illustrating a path of discharge due to an operation of a switching element according to a related art; and FIG. 7 is a diagram illustrating a path of discharge due to an operation of a switching element according to one or more embodiments.

DETAILED DESCRIPTION

Figure 1:
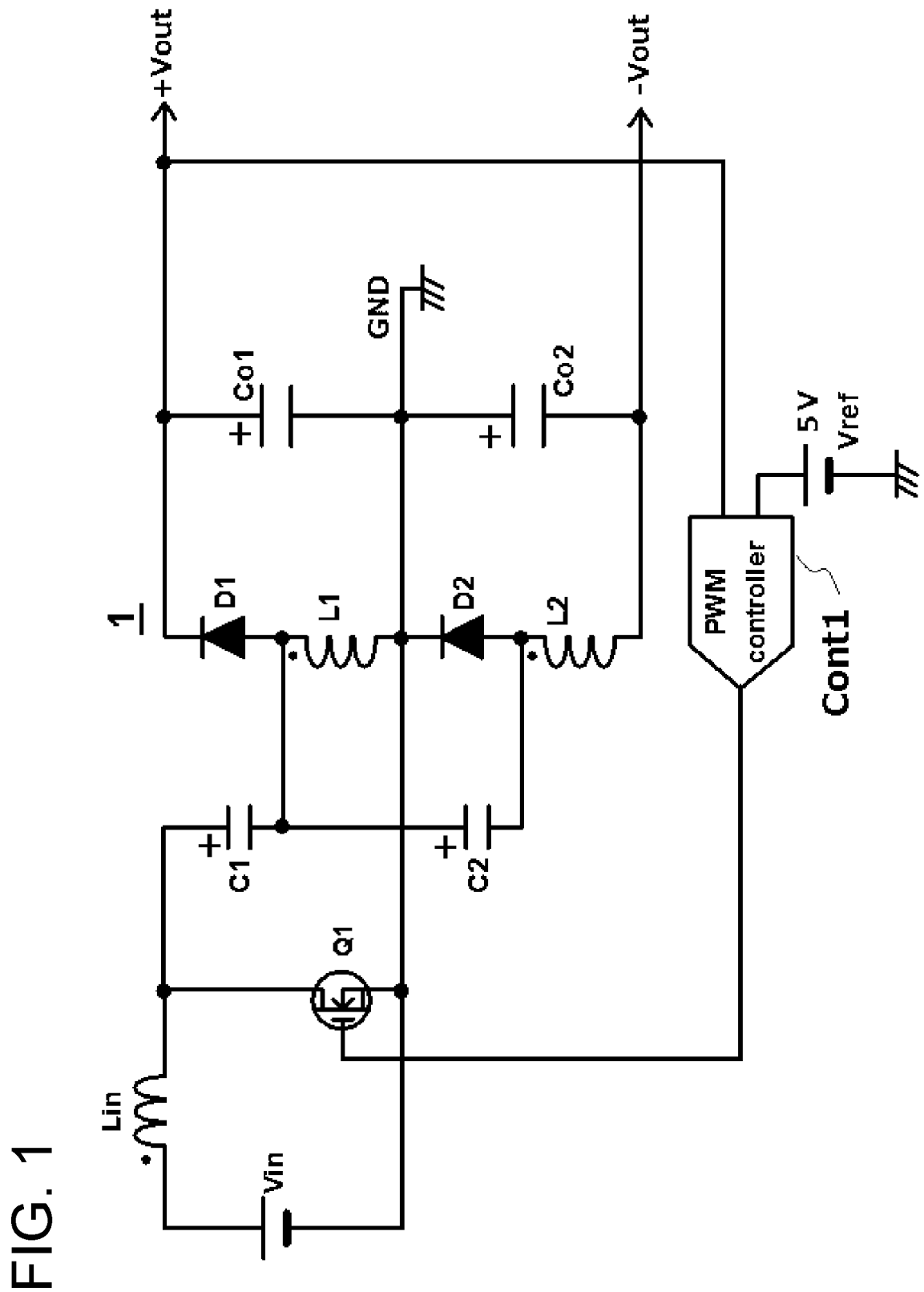
FIG. 1 is a diagram illustrating a DC/DC converter including a SEPIC circuit according to one or more embodiments.

A DC/DC converter according to one or more embodiments is described in detail with reference to drawings. FIG. 1 is a diagram illustrating a DC/DC converter 1 including a SEPIC circuit according to one or more embodiments. The DC/DC converter 1 includes the input side reactor Lin that is connected with the input voltage source Vin, the first coupling capacitor C1 that is electrically connected in series with the input side reactor Lin, the positive rectifier diode D1 that is electrically connected in series with the first coupling capacitor C1 and outputs a positive output voltage, a positive side reactor L1 that is electrically connected to a connecting point of the first coupling capacitor C1 and the positive rectifier diode D1 and a ground potential GND, the first smoothing capacitor Co1 that is electrically connected to the positive rectifier diode D1 and the ground potential GND, the second coupling capacitor C2 that is electrically connected in series with the first coupling capacitor C1, the negative rectifier diode D2 that is electrically connected to the negative rectifier diode D2 and the second coupling capacitor C2 and outputs a negative output voltage, the negative output side reactor L2 that is electrically connected to a connecting point of the second coupling capacitor C2 and the negative rectifier diode D2, and the second smoothing capacitor Co2 that is electrically connected to the negative rectifier diode D2, the ground potential GND, and the negative output side reactor L2.

The DC/DC converter 1 outputs a positive output voltage +Vout, which is an output potential of the positive rectifier diode D1, and the first smoothing capacitor Co1. The DC/DC converter 1 outputs a negative output voltage −Vout, which is an output potential of the negative rectifier diode D2, and a second smoothing capacitor Co2. The PWM signal controller Cont1 generates an on/off drive signal of the switch Q1. The PWM signal controller Cont1 conducts a feedback control by calculating an error signal between a reference voltage Vref and the positive output voltage +Vout.

Figure 4:
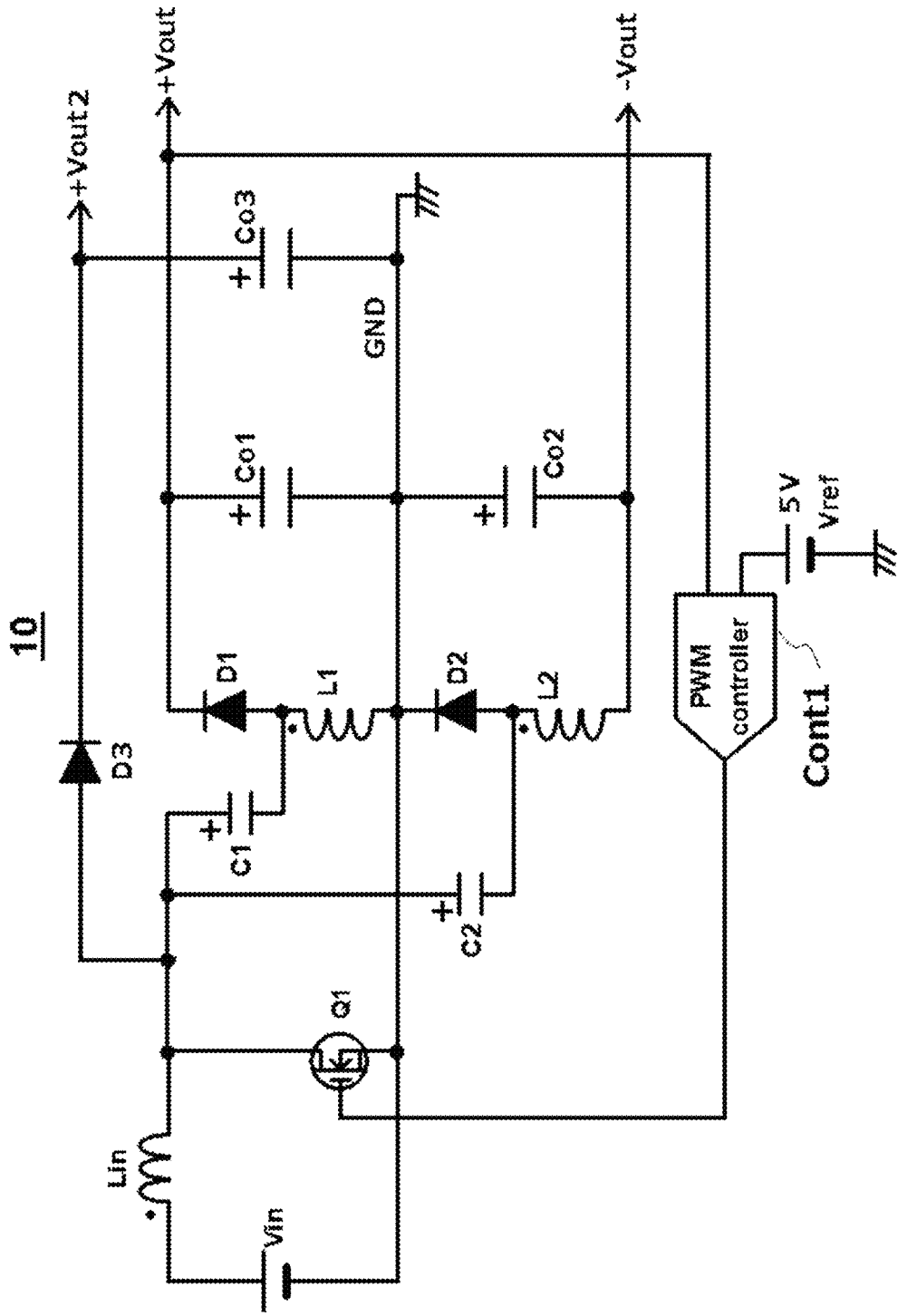
FIG. 4 is a diagram illustrating a SEPIC circuit according to a related art.

Compared to a DC/DC converter illustrated in FIG. 4, a DC/DC converter illustrated in FIG. 1 is organized with only two outputs, positive and negative poles, by deleting a diode D3 and a capacitor Co3. But the same number of components for a function illustrated in FIG. 4 may be used for the DC/DC converter illustrated in FIG. 1. However, the DC/DC converter illustrated in FIG. 1 differs from the DC/DC converter illustrated in FIG. 4 in that a decoupling capacitor C1 and a decoupling capacitor C2 are connected in series. That is, a positive terminal of the decoupling capacitor C2 is connected to a connecting point of the input side reactor Lin and a drain of the switching element Q1 via a connecting point of the decoupling capacitor C1, an anode terminal of the positive rectifier diode D1, and the positive side reactor L1.

In the DC/DC converter illustrated in FIG. 1, the positive output voltage may be indicated by the following equation. First, the positive output voltage +Vout side is equal to the charge and the discharge of the input side reactor Lin under a steady state; therefore, $$Vin \cdot D = (Vco1+Vc1-Vin) \cdot (1-D)$$

$$D/(1-D) = (Vco1+Vc1-Vin)/Vin \qquad \mathrm{EQ}(7)$$

Since the positive side reactor L1 is equal to the charge and the discharged as well, $$Vc1 \cdot D = VCo1 \cdot (1-D)$$

$$D/(1-D) = VCo1/Vc1 \qquad \mathrm{EQ}(8)$$

From equations EQ(7) and EQ(8), $$(Vco1+Vc1-Vin)/Vin = VCo1/Vc1$$

$$Vc1 \cdot (Vco1+Vc1-Vin) - VCo1 \cdot Vin = 0$$

$$Vc1 \cdot (Vco1+Vc1) - Vc1 \cdot Vin - VCo1 \cdot Vin = 0$$

$$Vc1 \cdot (Vco1+Vc1) - (Vc1+VCo1) \cdot Vin = 0$$

$$(Vc1-Vin) \cdot (Vc1+VCo1) = 0$$

$$\therefore Vc1 = Vin$$

(Vc1=−VCo1 is not valid because of the breakdown of the diode D1.)

Therefore, the voltage of the decoupling capacitor C1 is the input voltage Vin.

Also, from equation EQ(7), $$D/(1-D) \cdot Vin = (VCo1 + Vc1 - Vin)$$

$$VCo1 = Vin(D/(1-D)) + Vin - Vc1 =$$

$$(Vin \cdot D + Vin - Vin \cdot D)/(1-D) - Vc1 = (Vin)/(1-D) - Vc1$$

From Vc1=Vin,
the positive output voltage +Vout may be expressed as $$Vco1 = Vin \cdot D/(1-D)$$

Since the charge and the discharge of the input side reactor Lin are equal in the steady state on the negative output voltage −Vout side as well, $$Vin \cdot D = (Vc1+Vc2-Vin) \cdot (D-1)$$

$$D/(D-1) = (Vc1+Vc2-Vin)/Vin \qquad \mathrm{EQ}(9)$$

Since the charge and the discharge of the negative side reactor L2 are equal as well, $$(Vc1+Vc2-VCo2) \cdot D = VCo2 \cdot (D-1)$$

$$D/(D-1) = VCo2/(Vc1+Vc2-VCo2) \qquad \mathrm{EQ}(10)$$

From equations EQ(9) and EQ(10), $(Vc1+Vc2-Vin)/Vin=VCo2/(Vc1+Vc2-VCo2)$ $(Vc1+Vc2-Vin)\cdot(Vc1+Vc2-VCo2)=Vin\cdot VCo2$ $Vc1+Vc2=Vin+VCo2$ The voltages of the decoupling capacitor C1 and the decoupling capacitor C2 are expressed as (the input voltage+ the output voltage). The voltage Vc1 of the decoupling capacitor C1 is found to be the input voltage and the voltage Vc2 of the decoupling capacitor C2 is VCo2 since the voltage Vc1=Vin from the SEPIC operation described above.

From equation EQ(7), $D/(1-D)=(Vc1+Vc2-Vin)/Vin$ $Vin\cdot D/(1-D)=Vc1-Vc1+Vin$ $Vin\cdot D/(1-D)+Vin=Vc1+Vc2$ $(Vin\cdot D+Vin-Vin\cdot D)/(1-D)=Vc2$ $Vin/(1-D)=Vc2$      EQ(11)

From equation EQ(8), $D/(1-D)=Vco2/(Vc1+Vc2-VCo2)$ $D(Vc1+Vc2-Vco2)=Vco2(1-D)$ $D\cdot Vc1+D\cdot Vc2-D\cdot Vco2=VCo2-D\cdot Vco2$ $D\cdot Vc1+D\cdot Vc2=Vco2$ $Vc1+Vc2=VCo2/D$      EQ(12)

From equations EQ(11) and EQ(12), $Vin/(1-D)=VCo2/D$ $VCo2=Vin\cdot D/(1-D)$

VCo1 and VCo2 output the same voltage.

Therefore, the same voltage is output for the positive output voltage +Vout (=VCo1) and the negative output voltage −Vout (=VCo2).

FIG. 7 is a diagram illustrating a path of discharge due to an operation of a switching element according to one or more embodiments. As illustrated in FIG. 7, for example, in the DC/DC converter illustrated in FIG. 1, when the switching element Q1 is OFF, a discharge path of the positive side reactor L1 is not only a discharge path f, which is the positive side reactor L1→the diode D1→the capacitor Co1→the positive side reactor L1, but also a discharge path h, which is the positive side reactor L1→the decoupling capacitor C1→the decoupling capacitor C2→the diode D2→the positive side reactor L1.

The discharge path of the negative side reactor L2 is not only a discharge path g, which is the negative side reactor L2→the diode D2→the capacitor Co2→the negative side reactor L2, but also a discharge path i, which is the negative side reactor L2→the decoupling capacitor C2→the diode D1→the capacitor Co1→the capacitor Co2→the negative side reactor L2.

The DC/DC converter illustrated in FIG. 4 forms two additional paths through the decoupling capacitor C1, but the DC/DC converter illustrated in FIG. 1 does not have a path through the decoupling capacitor C1.

Hence, $VCo1=Vc2$ $VCo2=VCo1+VCo2-Vc2$

When the capacitance of the decoupling capacitor C2 is large enough for the output current, the voltage Vc2 of the decoupling capacitor C2 becomes VCo2; therefore, $VCo1=VCo2=Vc2$ Therefore, by making the capacitance of the decoupling capacitor C1 small and the decoupling capacitor C2 large, the cross regulation is improved. In other words, since the capacitance of the decoupling capacitor is only C1, there is an advantage that improvements in start-up time and load response may be achieved simultaneously.

The DC/DC converter according to one or more embodiments may provide a multi-output SEPIC circuit with good cross regulation accuracy regardless of the cross load current.

Figure 2A:
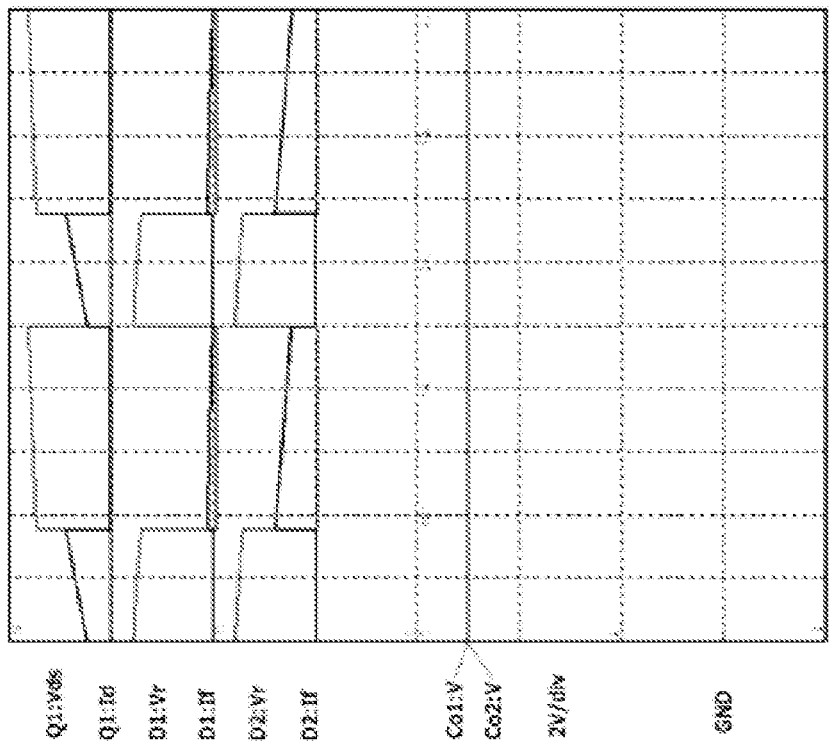
FIG. 2A is a diagram illustrating cross regulation characteristics (Io(P)=100 mA, Io(M)=10 mA) of the DC/DC converter such as is illustrated in FIG. 1.
Figure 2B:
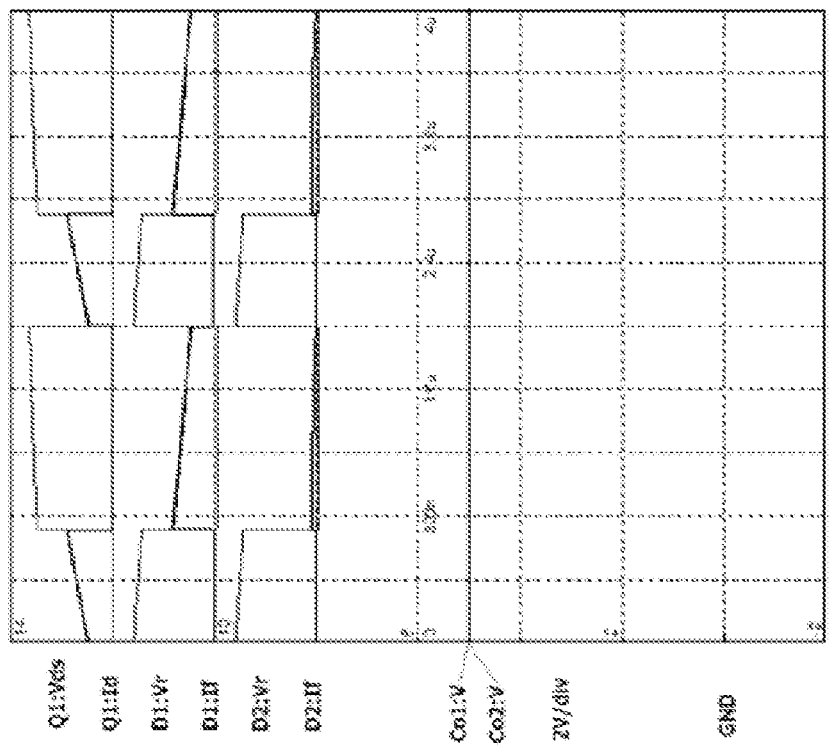
FIG. 2B is a diagram illustrating cross regulation characteristics (Io(P)=10 mA, Io(M)=100 mA) of the DC/DC converter such as is illustrated in FIG. 1.

In the related arts, as shown in the cross regulation characteristic diagrams in FIGS. 5A and 5B, under the condition of positive and negative pole output voltage ±Vout cross-load current, the output voltage of the one with higher load current decreases, while the output voltage of the one with lower load current increases, resulting in poor cross-regulation accuracy. In one or more embodiments shown in the cross regulation characteristic diagrams in FIGS. 2A and 2B, the stability of the output voltage, and the accuracy of cross regulation may be improved even under the condition of positive and negative pole output voltage ±Vout cross load current.

Although one or more embodiments are described above, the above-mentioned embodiments are examples to embody the technical concept, and individual configurations, combinations, etc. are not specific to those described above. A various change may be made to one or more embodiments described to the extent that the gist is not departed from.

Figure 3:
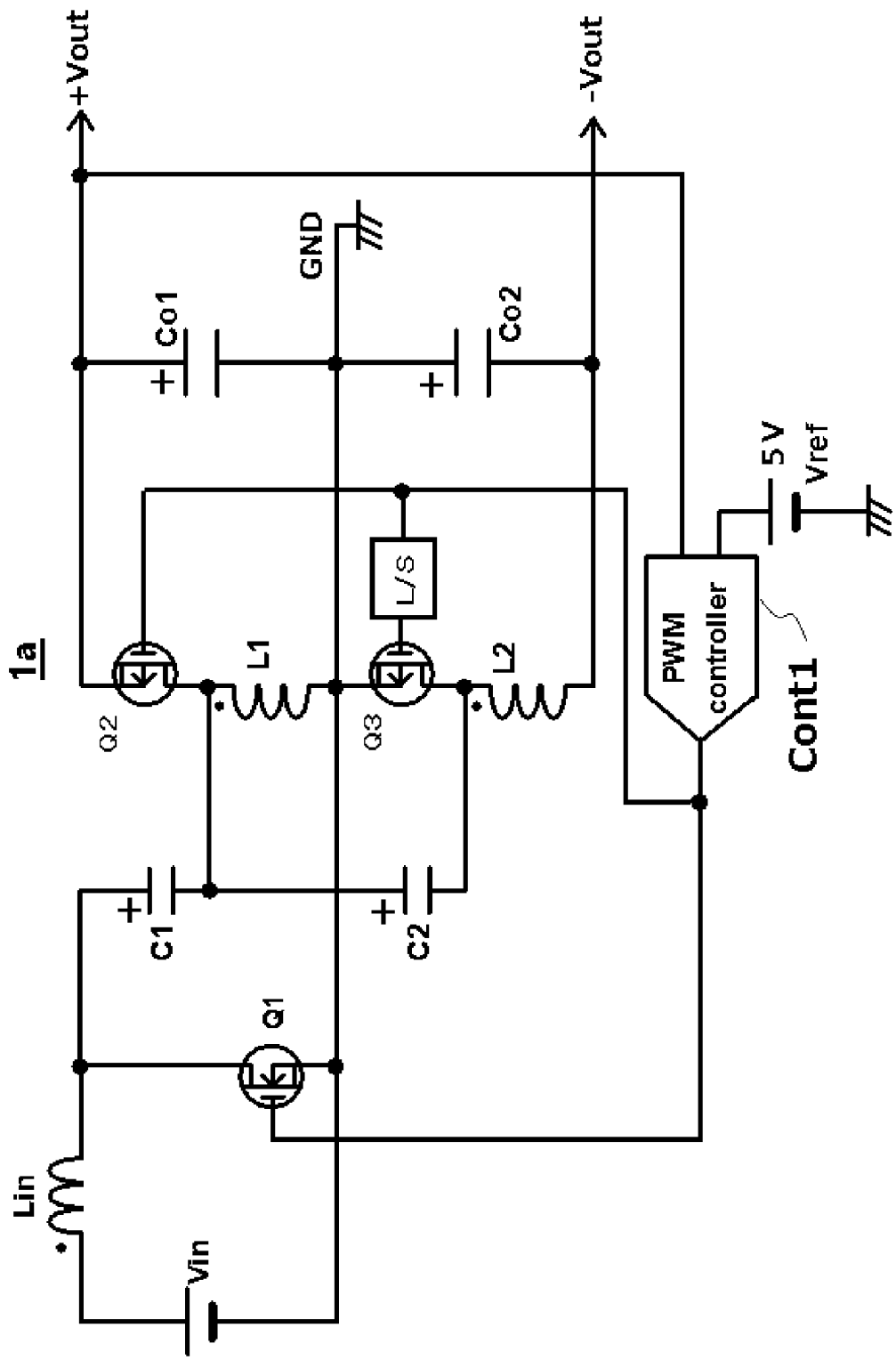
FIG. 3 is a diagram illustrating a DC/DC converter of a SEPIC circuit including a synchronous rectifier circuit according to one or more embodiments.

For example, as illustrated in FIG. 3, the diode D1 and the diode D2 may be replaced with a synchronous rectification element of a P-channel MOSFET Q2 and a synchronous rectification element of a P-channel MOSFET Q3. By replacing the diode with the synchronous rectification element, loss reduction of the rectification element may be obtained. Comparing forward voltage characteristics of the diode with a voltage drop due to an ON resistance of the P-channel MOSFET with respect to an output current variation, a value of the voltage drop due to the ON resistance is smaller, which has an effect of improving the cross regulation accuracy.

As described above, the DC/DC converter according to one or more embodiments is suitable for obtaining the multi-output of positive and negative poles. Thus, the DC/DC converter may be used as a power supply for an in-car device, etc.

The invention claimed is:

1. A SEPIC (single ended primary inductor converter) DC/DC converter that provides positive and negative output voltages, comprising:
    an input side reactor;
    a first coupling capacitor;
    a positive rectifier diode;
    a positive output side reactor;
    a first smoothing capacitor;
    a second coupling capacitor;
    a negative rectifier diode;
    a negative output side reactor; and a second smoothing capacitor, wherein:

the SEPIC DC/DC converter has a single input;

a positive output of the SEPIC DC/DC converter is electrically connected via the input side reactor, the first coupling capacitor, and the positive rectifier diode;

the first smoothing capacitor is electrically connected between the positive output and a ground potential;

the positive output side reactor is electrically connected between a connecting point of the first coupling capacitor and the positive rectifier diode and the ground potential;

a negative output of the SEPIC DC/DC converter is electrically connected to the connecting point of the first coupling capacitor, the positive rectifier diode, and the positive output side reactor via the second coupling capacitor and the negative output side reactor;

the second smoothing capacitor is electrically connected between the negative output and the ground potential;

the negative rectifier diode is connected between a connecting point of the second coupling capacitor and the negative output side reactor and the ground potential;

the first coupling capacitor has a first capacitance and the second coupling capacitor has a second capacitance; and a ratio of the first capacitance and the second capacitance is set to improve cross regulation between the positive output and the negative output.

2. The SEPIC DC/DC converter according to claim 1, wherein the positive rectifier diode and the negative rectifier diode comprise a synchronous rectification element.

3. A SEPIC (single ended primary inductor converter) DC/DC converter that has a single input and provides positive and negative output voltages comprising:

an input side reactor connected to the single input;

a first coupling capacitor that is electrically connected in series with the input side reactor;

a positive rectifier diode that is electrically connected in series with the first coupling capacitor and outputs a positive output voltage;

a positive output side reactor that is electrically connected to a connecting point of the first coupling capacitor and the positive rectifier diode and a ground potential;

a first smoothing capacitor that is electrically connected to the positive rectifier diode and the ground potential;

a second coupling capacitor that is electrically connected in series with the first coupling capacitor;

a negative rectifier diode that is electrically connected to the positive output side reactor and the second coupling capacitor and outputs a negative output voltage;

a negative output side reactor that is electrically connected to a connecting point of the second coupling capacitor and the negative rectifier diode; and a second smoothing capacitor that is electrically connected to the negative rectifier diode, the ground potential, and the negative output side reactor, wherein the first coupling capacitor has a first capacitance and the second coupling capacitor has a second capacitance; and a ratio of the first capacitance and the second capacitance is set to improve cross regulation between the positive output and the negative output.

4. The SEPIC DC/DC converter according to claim 3, wherein the positive rectifier diode and the negative rectifier diode comprise a synchronous rectification element.

5. The SEPIC DC/DC converter according to claim 1, wherein the first capacitance is set smaller than the second capacitance.

6. The SEPIC DC/DC converter according to claim 3, wherein the first capacitance is smaller than the second capacitance.

\* \* \* \* \*